US010124262B2

(12) United States Patent
Kaiblinger et al.

(10) Patent No.: US 10,124,262 B2
(45) Date of Patent: Nov. 13, 2018

(54) RANDOM NUMBER GENERATOR

(71) Applicant: NOVOMATIC AG, Gumpoldskirchen (AT)

(72) Inventors: Harald Kaiblinger, Pfaffstätten (AT); Florian Schrötter, Traiskirchen (AT)

(73) Assignee: NOVOMATIC AG, Gumpoldskirchen (AT)

( * ) Notice: Subject to any disclaimer, the term of this patent is extended or adjusted under 35 U.S.C. 154(b) by 1051 days.

(21) Appl. No.: 14/070,323

(22) Filed: Nov. 1, 2013

(65) Prior Publication Data
US 2015/0005048 A1 Jan. 1, 2015

Related U.S. Application Data

(63) Continuation of application No. PCT/EP2011/002203, filed on May 3, 2011.

(51) Int. Cl.
*G07C 15/00* (2006.01)
*A63F 13/812* (2014.01)
*G06F 7/58* (2006.01)

(52) U.S. Cl.
CPC .............. *A63F 13/812* (2014.09); *G06F 7/58* (2013.01); *G06F 7/588* (2013.01)

(58) Field of Classification Search
CPC .............. A63D 3/00; A63F 3/06; A63F 7/048
USPC ......................................................... 463/22
See application file for complete search history.

(56) References Cited

U.S. PATENT DOCUMENTS 5,437,575 A * 8/1995 Douglass, Jr. ........ A63F 7/0005
 273/269
5,518,239 A 5/1996 Johnston
5,577,971 A * 11/1996 File .......................... A63D 1/00
 273/269

(Continued)

FOREIGN PATENT DOCUMENTS

DE 69803684 10/2002
DE 10358392 7/2005

(Continued)

OTHER PUBLICATIONS

Glickman, M.E., "Bayesian locally optimal design of knockout tournaments" *Journal of Statistical Planning and Inference*, vol. 138, pp. 2117-2127, 2008.

(Continued)

*Primary Examiner* — Tramar Harper
*Assistant Examiner* — Jeffrey Wong
(74) *Attorney, Agent, or Firm* — Levine Bagade Han LLP

(57) ABSTRACT

The present invention relates to a random number generator for the provision of a random number and/or a random number combination and/or random number matrix. According to invention the random number generator comprises a monitor apparatus for monitoring at least one skill/skilled sport installation, on which a game of skill/skilled sport can be executed by at least one participant, which delivers at least one game outcome, wherein the monitoring apparatus comprises game outcome ascertainment means for the determination of the game outcome, and a determination apparatus for the determination of the winning number and/or winning number combination and/or winning number matrix from one or multiple determined game outcomes.

27 Claims, 3 Drawing Sheets

(56) References Cited

U.S. PATENT DOCUMENTS

| | | | | |
|---|---|---|---|---|
| 2009/0143883 A1* | 6/2009 | Pines | ..................... | A63D 5/04 |
| | | | | 700/92 |
| 2011/0275432 A1* | 11/2011 | Lutnick | ............... | G07F 17/3232 |
| | | | | 463/25 |
| 2013/0012330 A1* | 1/2013 | Speed | ..................... | A63D 5/04 |
| | | | | 473/54 |

FOREIGN PATENT DOCUMENTS

| | | |
|---|---|---|
| DE | 102004047425 | 4/2006 |
| DE | 102006009939 | 9/2007 |
| DE | 102008033162 | 1/2010 |
| DE | 202010016063 | 3/2011 |
| WO | WO 1999/026204 | 5/1999 |
| WO | WO 2000/038037 | 6/2000 |
| WO | WO 2010/099582 | 9/2010 |
| WO | WO 2012/149944 | 11/2012 |

OTHER PUBLICATIONS

International Patent Application No. PCT/EP2011/02203 filed May 3, 2011 in the name of Novomatic AG, International Search Report dated Mar. 27, 2012.

\* cited by examiner

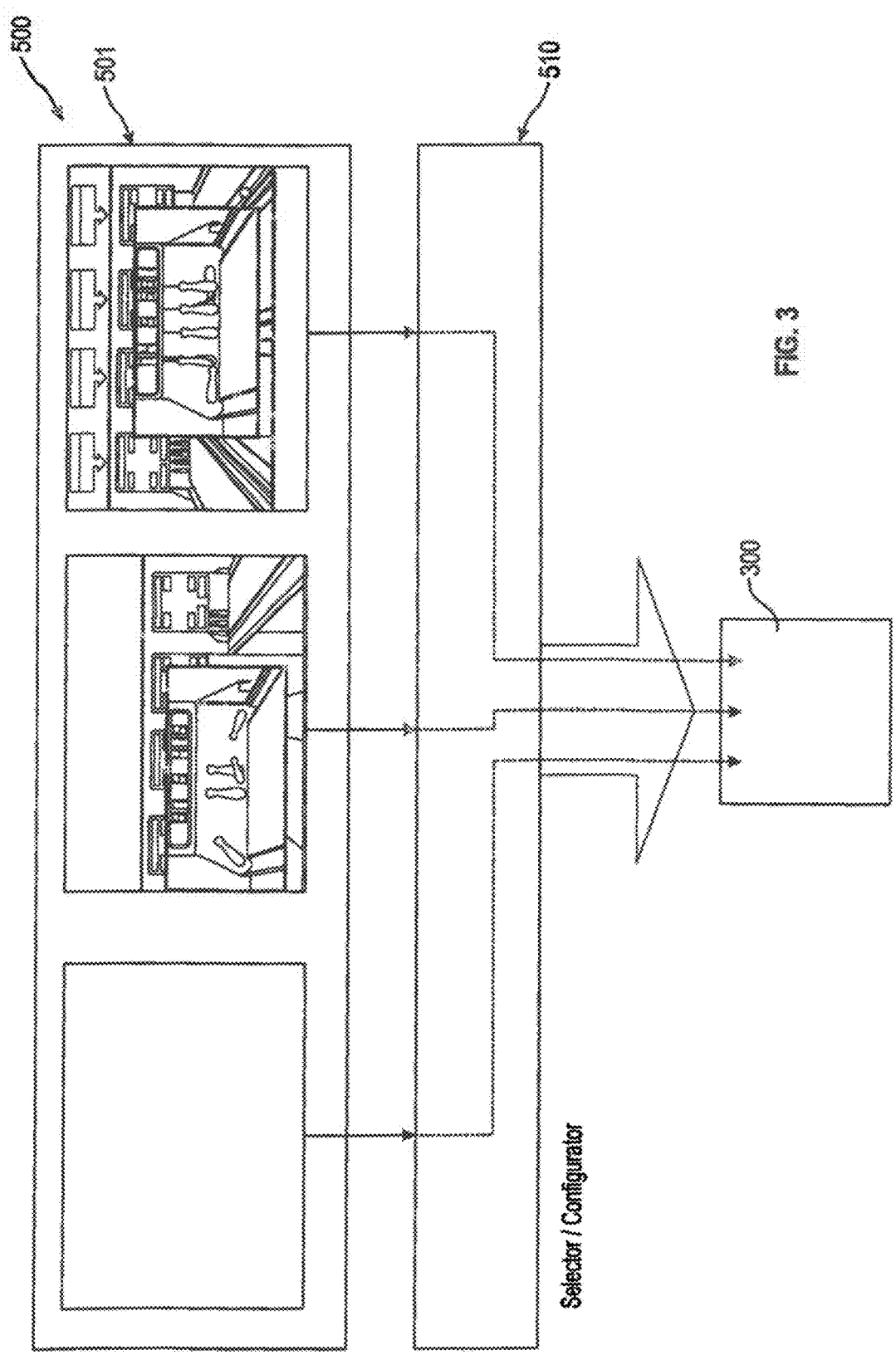

RANDOM NUMBER GENERATOR

CROSS-REFERENCE TO RELATED APPLICATIONS

The present application is a continuation of PCT Application No. PCT/EP2011/002203, filed May 3, 2011, which is incorporated by reference herein in its entirety.

BACKGROUND

1. Technical Field

The present invention relates to a random number generator for the provision of random number and/or a random number combination and/or random number matrix.

2. Description of the Related Art

The generation of random numbers is needed for many applications, for example in cryptographic applications, stochastic simulations, tests of software and hardware, gambling and competition or also art and music. Due to the increased demand of randomly generated numbers, number combinations, or number matrix such random numbers are offered for different application purposes on interim platforms, see, for example, www.random.org.

The generation of random numbers hereby usually occurs via electronic circuits comprising micro processes, instable switch gates, and such like. Such electronic random generators are, for example, known in DE 10 2004 047 425 B4, DE 10 2006 009 939 B9 or EP 10 12 972 B1. But there remain doubts regarding such electronic random generators whether the numbers generated by electronic circuits are actually generated according to the principle of contingency. In addition, the creation of random numbers is not comprehensible for the user.

Apart from such electronic random generators, random generators operating according to other principles have already been recommended, which, for example, use physical or mechanical processes. For example WO 00/38037 describes a random number generator, which uses an alpha radiation source and counts or captures the alpha particles emitted by an isotope. US 2007/0245293 A1 describes also a random number generator that operates with a liquid drop. The liquid drop falls on a cone and there takes an unpredicted path along which the drop actuates different detection sensors. DE 20 2010 016 063 U1 describes a mechanical random generator in the shape of a cube which is approximately of a spherical shape and is furnished with meridian lines between which flattenings are foreseen. Through the approximate spherical shape the danger of manipulation when throwing the cube is to be reduced. In addition, DE 10 2008 033 162 A1 describes a physical random generator which uses two oscillations of which one is stabilised regarding its duty cycle and the other is not stabilised. Hereby it is then monitored or determined whether with the existence of an amplitude of the first oscillation also the second oscillation has an amplitude or not through which the corresponding bit sequence can be created. DE 103 58 392 A1 describes a random number generator that works with boiling liquids. The area above the boiling liquid into which the vapour bubbles ascend is rayed from a light source so that on a photo transistor, which is arranged on the opposite side of the light source of the vapour bubble area, a different number of photons arrive.

However, such physical random number generators still offer possibilities of manipulation and depending on the design are subject to physical laws which are not random, for example the inclination of the cone for the drop attempt, temperature exactitude and liquid variation with the vapour bubble attempt, etc. According to the design there is only a very limited speed of the number generation which is particular disadvantageous for multi-digit random number sequences.

SUMMARY OF THE INVENTION

The present invention has the problem to create an improved random number generator of the above-mentioned kind, which prevents the disadvantages of the state-of-the-art technology and to develop the latter further in a favourable manner. In particular a random number determination of interest to the user and sufficiently fast for the time required to do so is to be created, which impedes manipulation and deceit and improves the safety of the control, monitoring and evaluation of the random number generation.

According to the invention the mentioned problem is solved by a random number generator in accordance with claim 1. Preferred embodiments of the invention are subject of the dependent claims.

It is thus recommended to resort to a game of skill/skilled sport for the ascertainment of a random number or random number combination or random number matrix whose outcome is a discrete numerical value and to transmit it to the control of the random number generator. The number or number combination ascertained from the game outcome can be used, for example, in an automatic gambling or gaming machine as random number or random number combination or also for other applications instead of a random number or random number combination generated by an electronic random generator. This is advantageous insofar as for a user by indicating of the course of the game of skill/skilled sport the creation of random numbers is transparent, i.e. it is a comprehensible or visible event, and thereby the trust of in the system is strengthened. At the same time the system offers in sufficiently short time intervals reliable random numbers. According to invention the random number generator comprises a monitor apparatus for monitoring at least one skill/skilled sport installation, on which a game of skill/skilled sport can be executed by at least one participant, which delivers at least one game outcome, wherein the monitoring apparatus comprises game outcome ascertainment means for the determination of the game outcome, and a determination apparatus for the determination of winning number and/or winning number combination and/or winning number matrix from one or multiple determined game outcomes. The random number, random number combination or random number matrix can directly correspond with the respective numerical value of one or multiple game outcome(s), but can preferably also be derived in consideration of a predetermined calculation or generation rule.

A game of skill/skilled sport within the meaning of the present registration can hereby comprise different thrills of games or competition or generally live events, which can be held for fun without profit opportunity by amateurs or professionals or in the form of tournaments with competitive character and without profit opportunity. In a further advantageous embodiment of the invention the monitoring apparatus is hereby allocated to a skittle or bowling alley, on which in familiar fashion by the rolling along of a ball on an alley the skittles standing at the end of the alley can be overturned. The discrete numerical values serving as outcome are hereby the respective number of skittles or pins overturned by one attempt but also by multiple attempts.

Alternatively or additionally the monitoring apparatus can also monitor a shooting gallery installation, be it a bow and arrow installation, an arbalest installation, a gun or riffle installation, or also a dart installation. Hereby the numerical values used as outcome are the respectively hit target rings or target panels.

Depending on what type of application of a random number the game outcome in the form of a discrete numerical value is used for, the determination of the number sought or the number combination sought can occur in different ways. If, for example, for a lottery or a roulette game a single winning number is sought the above-mentioned determination apparatus can comprise a calculation apparatus for the calculation of a number out of multiple numerical values in accordance with a specifiable calculation specification. By using multiple numerical values for the determination of the number the predictability and the danger of manipulation can be reduced as the contingency component of the game of skill/skilled sport has a greater effect. For example, the game outcomes for skittle or bowling events of multiple players on different alleys can be added, or the outcome of one player in various attempts can be added, for example in such a manner that the number to be created or the winning number is added as a sum of the skittles overturned in one round by four skittle players competing with each other.

Alternatively or additionally, if not an individual number but a number sequence or a number matrix is to be determined, the mentioned determination apparatus can then comprise an allocation apparatus for the allocation of individual numerical values or the numbers calculated thereof to one respective number slot in the number sequence or number matrix in accordance with a specifiable attribution specification. Advantageously with the monitoring of the skittle or bowling alley the respective skittles overturned in one round by various participants can form the numerical value of one line, while skittles overturned in various rounds can form the further lines of the number matrix.

In a further advantageous embodiment of the invention at the user terminal, where the random number is requested and/or indicated, not only the outcome but also the course of the game outcome of the skill/skilled sport is indicated. Advantageously a screen is foreseen on the user terminal, which displays the images recorded by the cameras on the skill/skilled sport installation. Hereby a user of the gambling arid/or gaming terminal can follow the course of events of the competition after the number request in order to be then informed about the events occurred in the mentioned manner.

The monitoring apparatus can therefor advantageously monitor multiple alleys of the skill/skilled sport installation via the corresponding monitoring means in order to monitor the game outcomes of different participants on multiple alleys of the installation. The determination apparatus can then determine the sought number or number combination from the game outcomes of the different alleys. The monitoring therefor can in principle occur in different ways and manners. For example, the monitoring means can comprise cameras, which observe the skittle fields and identify the number of skittles or pins overturned by an image evaluation apparatus, preferably through a before and after comparison. Alternatively or additionally the outcome determination means for the determination of the game outcome can also be integrated in the setter apparatus for the automatic setting of the skittles or pins, for example in such a manner that the outcome determination means identify the displacement of the threads on which the skittles are hanging when overturning the respective skittles, or with a threadless setter apparatus identify by means of the grippers the skittles remaining standing and/or the overturned skittles, for example by the gripper head with the gripper means initially reverting to the setter position and taking hold wherein the remaining standing skittles can be identified.

With game or sport locations with various alleys the allocation of the individual alleys to the participants is advantageously determined or allotted by a random number generator, i.e. combination pairs of the respective participants and the respective alley are ascertained. Thereby an improved distribution of contingency can be achieved as existing alley particularities such as, for example, different light incidence, different alley inclination or different evenness of the game alleys are integrated in the determination of the numbers or number combinations. Advantageously the participants are hereby determined out of a participant pool by a random number generator and allocated to the respective alleys, or conversely the alleys are allocated to the selected participants. Advantageously the number of participants can be greater than the number of the alleys to be played. Alternatively or additionally also the allocation of the game equipment, in particular the throw ball or bowling ball to the participants, can be determined.

In a further advantageous embodiment of the in vend on also multiple skill/skilled sport locations, for example in the form of bowling or skittle alleys which are foreseen at different places or also in different countries, can be monitored by means of multiple monitoring apparatus of the mentioned kind in order to be able to select by means of a suitable selection apparatus a respective skill/skilled sport installation, whose game outcomes are then used for the ascertainment of winning numbers or winning number combinations or winning number matrix. The selection can hereby occur in principle in different ways and manners. For example, the selection apparatus could comprise an electronic random number generator by means of which the skill/skilled sport installation used for the winning number ascertainment is selected in a random manner. Alternatively or additionally the gambling and/or gaming terminal can also comprise input means by means of which the skill/skilled sport installation used for the winning number ascertainment can be selected by the user of the gambling and/or gaming terminal. Hereby the respective user of the gambling and/or gaming apparatus is given greater transparency and the feeling of absolute security against manipulation as the ascertainment of the winning number or the winning number combination depends on the selection of the skill/skilled sport installation by the user. Notwithstanding, through the mentioned selection apparatus the degree of contingency of the winning number ascertainment is further increased as the influences of different skill/skilled sport installations and the execution of skill/skilled games thereon, which can be different, for example with a first installation bowling and with a second installation dart, are integrated in the winning number determination.

In a further advantageous embodiment of the invention the selection apparatus can hereby feature allocation means which make it possible to select for different number slots of a number combination or number matrix different skill/skilled sport installations in such a manner that, for example, for the first column of a number matrix a first skill/skilled sport installation is selected and the hence ascertained game outcomes are used, for a second column of the winning number matrix a second skill/skilled sport installation is used and the there ascertained game outcomes are used, and for a third column of the winning number matrix a third skill/skilled sport installation—or, if applicable, also the first skill/skilled sport installation—is selected and the there ascertained game outcomes are used.

The mentioned allocation of the different, selected skill/skilled sport installations to the individual number slots can hereby occur in principle in different manners. For example, the mentioned allocation means can comprise an electronic or other physical random number generator in order to conduct the allocation in a random manner. But alternatively or additionally input means can be foreseen at the user terminal which permit the mentioned allocation to be performed by the user of the random number generator.

In order to prevent manipulation regarding the game control it is recommended to divide the data used for the control or monitoring of the game operation in multiple locations and file selectively in different data memories, so that only a central control or monitoring computer, which, if applicable, can consists of multiple, separate computer units, has access to all necessary data. In particular the participant-specific and the sport equipment-specific data are divided in order to be able to monitor and control centrally the allocation of participant and game equipment or alley to each other. Advantageously every game participant is provided with a participant memory separate from the game equipment memory, in which participant data, in particular identification data such as participant identification are saved, which are readout by a reception/reading apparatus and are filed in the database, in which also the game equipment data is saved, and/or are filed in a further database, and wherein the game equipment data saved in the database or the databases and the participant data are allocated to each other with the aid of allocation means and wherein renewed readout of the game equipment data and participant data is performed and the allocation of the renewed readout game equipment data with the renewed readout participant data is compared with the previous allocation assigned by the allocation means. With the division of the data to be saved into multiple memory locations and the usage of separate saving means on the game equipment—in the event of skittle alleys on the balls—as well as on the participants the manipulation possibilities are reduced substantially, in particular also because the connection of the relevant data, on the one hand relating to the game equipment and/or the game alleys and on the other hand relating to the participants, occurs at a central computer and the database allocated thereto at a location not only separate of the participants but also of the game equipment. In addition, the control of the allocation of participants and game equipments thereby becomes variable and can also be specified by the computer system only shortly prior to the commencement of the game, wherein manipulation of the game equipment and the game equipment memories attached thereto is made difficult. In particular the allocation generated by the allocation means can also be used to specify a starting position. The renewed readout of the game equipment data and participant data and the monitoring of the allocation of the renewed readout data with the previous allocation assigned by the allocation means permits the assertion whether the generated game equipment/participant allocation was adhered to.

The readout of the game equipment data saved in the game equipment memories and the participant data saved in the participant memories can hereby occur actively or passively, depending on which type of memory elements are used on the game equipment and the participants. For example, the memories foreseen for the game equipment and/or the participants can be provided with actively sending sender units so that in this case a passive reception apparatus for the readout or reception of data is sufficient. Alternatively or additionally also only passive and on demand sending sender units can be foreseen on the game equipment and/or the participants so that in this case advantageously active reading apparatus for readout of the corresponding data are used which query with corresponding signals the memory means on the game equipment and/or participants actively.

In particular RFID elements can be used as game equipment memory and/or participant memory, wherein advantageously in this case the mentioned reception/reading apparatus are designed as RFID reading apparatus. The use of such RFID elements and corresponding RFID reading apparatus has numerous advantages, amongst others, there is not "sight contact" necessary between sender and receiver, furthermore a high resolution of the position location is possible, i.e. the readout of data can occur in a simple manner only if the RFID tag is located at the right thereof foreseen place, and furthermore it is possible to work with low electricity consumption values.

Alternatively or additionally to such RFID elements or RFID reading apparatus also barcode elements can be used as participant memory or game equipment memory, whose barcode contains the respective information, in particular game equipment identification or participant identification. As reading apparatus advantageously barcode readers are then used with the aid of which barcode elements can be read.

With the above-mentioned usage of separate memory elements on the game equipment and the participants the allocation of participants and game equipment to each other can be specified at a short notice and reversed in order to eliminate the interest of manipulation on specific game equipment. The computer system for the monitoring or control of the game operation, which has access to at least one database in which the game equipment data and the participant data are filed in separate memory locations, allocates a specific participant to a specific game equipment and shows this on an indicator panel or another suitable indicator means shortly prior to the commencement of a game. In particular the computer can therefor feature an electronic random number generator or be connected to such one, so that the random number generator performs the allocation of game equipment data to the participant data automatically so that a determined game equipment is allocated to a determined participant in a random manner.

In a further embodiment of the invention a monitoring apparatus is foreseen which monitors whether the allocation specified by the allocation means of participant and game equipment is also adhered to. In dependence of a monitoring signal released by the monitoring apparatus the event can be, for example, cleared or stopped.

In a further advantageous embodiment of the invention a monitoring apparatus is additionally or alternatively foreseen, which monitors whether a respective game equipment is used on the "right" alley allocated by the computer. Advantageously with the existence of multiple alleys hereto every alley can be allocated to a reception/reading apparatus for the readout of the game equipment data from a game equipment memory, wherein the mentioned reception/reading apparatus is advantageously designed in such a manner that from the respective apparatus only the game equipment data of the respective game equipment is readout which is located on the respective alley. Advantageously corresponding RFID reading apparatus can be integrated in the skittle alleys, for example positioned underneath the alley surface.

Advantageously an allocation of the game equipment data and/or participant data saved in the database to the alleys also occurs automatically by the means of a random number generator, wherein the computer-assisted allocation of the alleys to the game equipment data and/or participant data is indicated prior to the commencement of a game on the previously mentioned indicator means.

Advantageously the mentioned monitoring apparatus for the observance of alleys can comprise a release apparatus, which only releases the respective alley, if the game equipment data and/or participant data readout by a reading apparatus situated on the alley corresponds with the specified allocation of the alleys to the game equipment and/or participants. The mentioned release apparatus can in turn hereby be foreseen in the central computer for the control of the game operation in order to block the operation of the alley, if the game equipment and/or participant stand(s) on the wrong alley.

In a further embodiment of the invention advantageously also a monitoring of the skill/skilled sport installation is variably controlled by suitable monitoring means, for example in form of one camera or multiple cameras in dependence of game equipment data readout from the game equipment memories and/or in dependence of the participant data readout from the participant memories and/or the effected allocation of this game equipment and participant data. For example, the control is in such that the computer activates and/or deploys in each case the respective camera which has the currently active participant of a game within the area of coverage. Alternatively or additionally in dependence of the game equipment data readout from the game equipment memories the switch between different camera positions can be set, wherein in particular a setup of the switch means foreseen on the skill/skilled sport installation for switching the camera positions in dependence of the game equipment data can be set. For example, switch means can be foreseen which switch the camera position and/or activate a corresponding camera, if a game equipment is withdrawn from the game equipment storeroom on the alley or is approximated to the alley.

BRIEF DESCRIPTION OF THE DRAWINGS

The invention is subsequently further explained on the basis of a preferred embodiment and drawings relating thereto. The drawings show:

FIG. 3: a schematic representation of a selection apparatus foreseeable on a user terminal for the selection of at least one or multiple skittle alleys for the ascertainment of a random number by means of the game outcomes of at least one of the selected skittle alleys according to a further advantageous embodiment of the invention.

DETAILED DESCRIPTION

Figure 1:
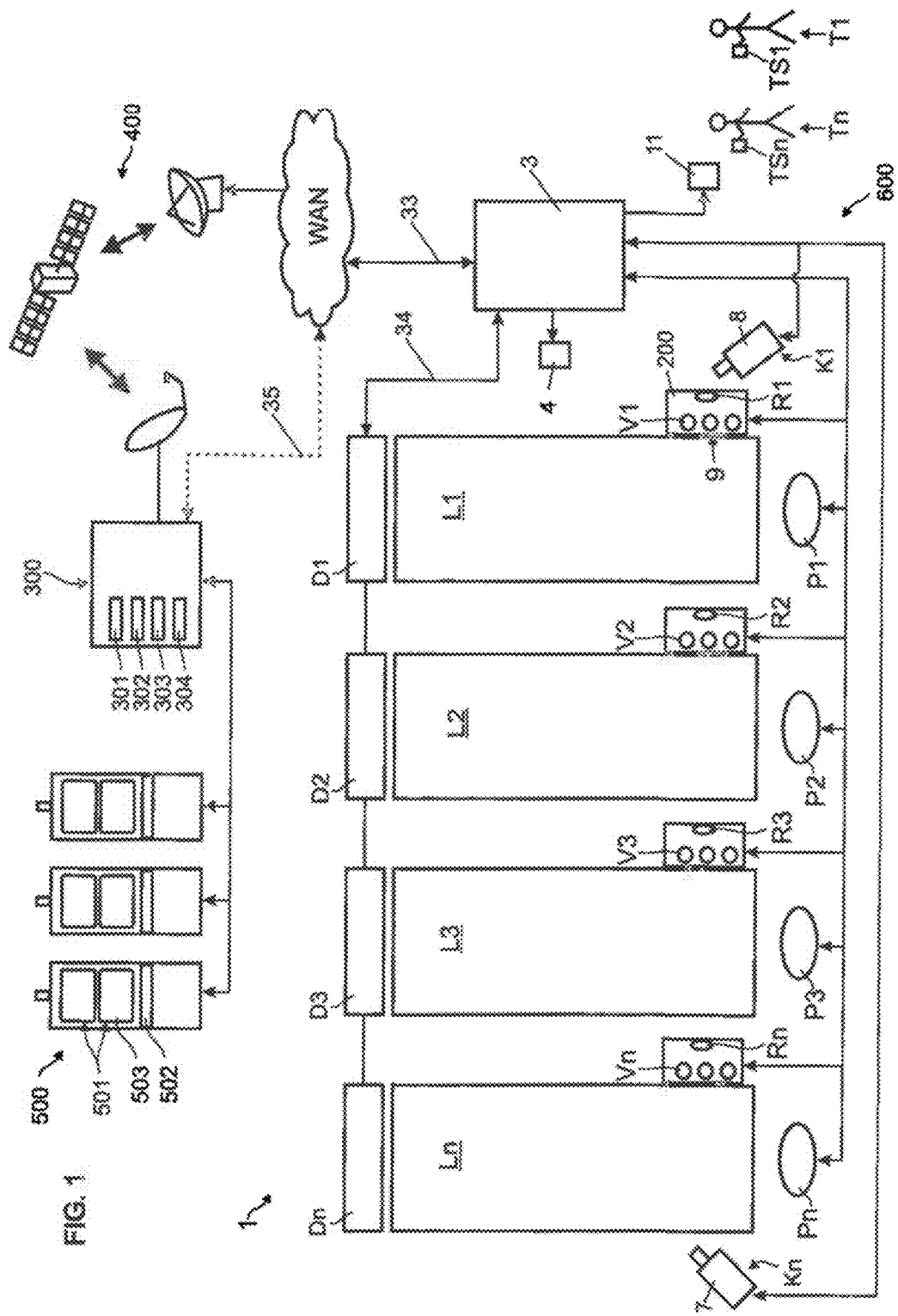
FIG. 1: a schematic representation of a multi-alley skill/skilled sport installation in form of a skittle alley, which is monitored by multiple cameras and is connected to a random number generator to which multiple user or request terminals are connected.

The skill/skilled sport installation shown in FIG. 1 comprises multiple alleys L1, L2, L3, Ln and advantageously can be designed as a skittle alley installation on which game equipment V1, V2, V3, Vn in the form of bowling balls or throw balls are thrown or rolled to skittles or pins positioned at the end of the alley.

As shown in FIG. 1 two cameras 7 and 8 are allocated to the skill/skilled sport installation in the drawn embodiment, which monitor different sections of the skill/skilled sport installation 1 in order to be able to transmit a respective game in the form of television images.

Advantageously for the skill/skilled sport installation 1 more participants can be registered with the aid of a central computer 3 than the skill skilled sport installation 1 has alleys. If, for example, a skittle alley installation is foreseen with four alleys eight different participants can for example be registered, wherein for each alley one participant can be registered so that a subset of the registered participants in a game can compete. If applicable, also teams of multiple participants can play on one respective alley. Per game event in each case only a maximum determined number of registered participants can be authorised for playing on a respective alley, while the participants not selected for a game event can have a break or can have the possibility to control the system or can be allocated to other tasks such as the alley service and/or the setting of the skittles.

Figure 2:
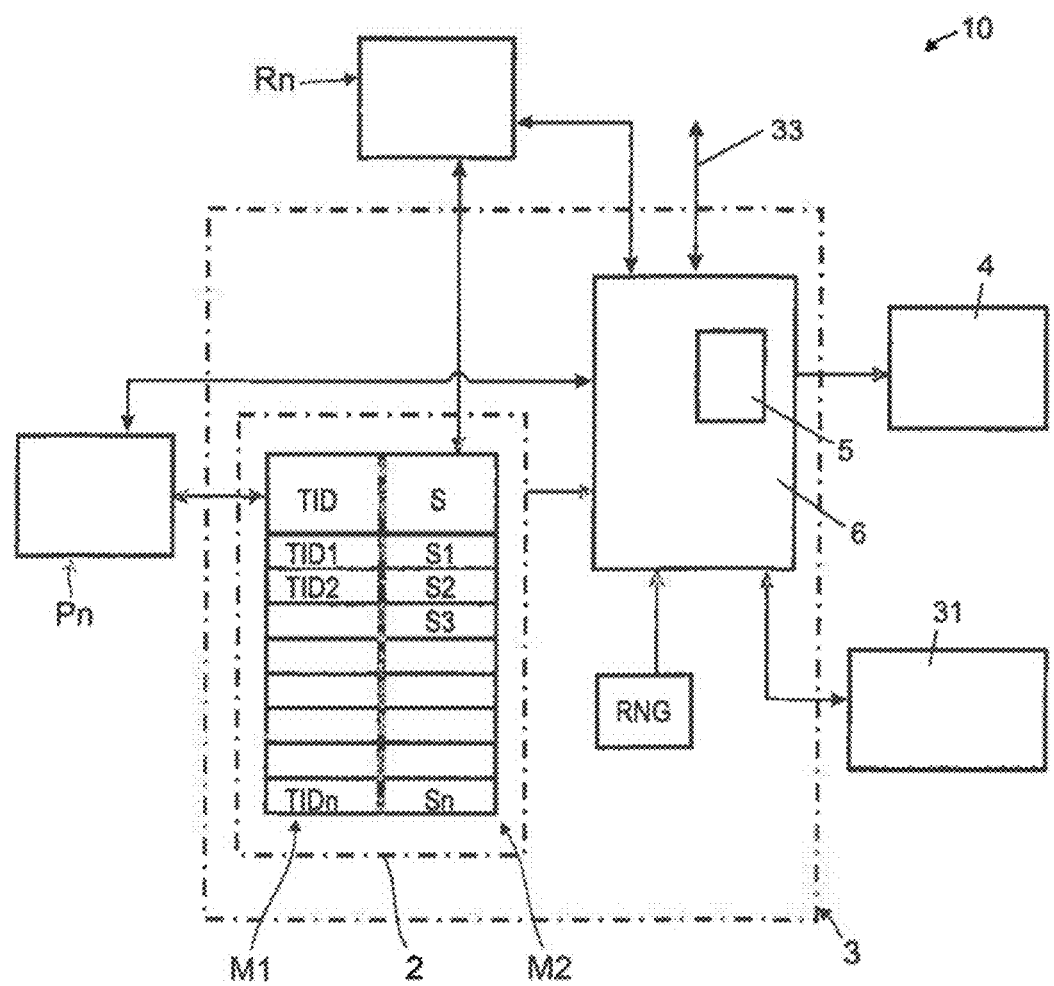
FIG. 2: a schematic representation of the control or monitoring apparatus for the game operation on the skittle alley of FIG. 1, which shows the interplay of the central computer system with participant memory and game equipment memory as well the game control.

For a start each participant T1, Tn is allocated to a participant memory TS1, TSn preferably in form of a RFID card with a respective participant identification TID1, TIDn, wherein prior to the game operation a registration of the respective participants occurs by a suitable reception and/or reading apparatus reading out, for example, in form of a RFID reader the respective participant memory TS1, TSn, wherein the respective associated participant identification TID is ascertained and is saved in a first memory area M1 of a central database 2, compare FIG. 2.

Furthermore the game equipment V1, V2, V3, Vn is equipped with a respective game equipment memory preferably in the form of a RFID element, which is allocated to a respective game equipment identification S1, S2, S3, Sn. In a subsequent step also prior to game operation a registration of the game equipment identification occurs by readout of the game equipment memory by means of a suitable reception or reading apparatus, wherein the game equipment identification S1, S2, S3, Sn is ascertained and is transmitted to the mentioned database 2, where it is filed in a second memory area M2, compare FIG. 2.

Preferentially multiple sets of game equipments can hereby be registered, wherein per game only one of the game equipments is used while the other ball set can be used as replacement for substitution after a determined number of games or a determined time.

After effected registration of the game equipment V1, V2, V3, Vn and the participants T1, Tn the central computer 3 automatically performs the allocation of the participants to the game equipment prior to the game commencement and indicates this allocation on an indicator 4. As shown in FIG. 2 the computer 3 can hereby feature a random number generator RNG, which performs the allocation of the participant to the game equipment in a random manner.

Advantageously the computer 3 also automatically performs an allocation of the game equipment to the respective alleys, wherein advantageously also this allocation to the alleys is performed by the random number generator RNG in a random manner. This allocation also is indicated prior to the game commencement on the indicator 4.

Corresponding to the allocation and selection specified on the indicator 4 subsequently the game equipment V1, V2, V3, Vn is to be registered on the corresponding alleys L1, L2, L3, Ln of the skill/skilled sport installation 1. This is monitored, for example, by means of the respective game equipment memories foreseen on the balls, wherein advantageously reception/reading apparatus R1, R2, R3, Rn are allocated to the respective alleys L1, L2, Ln, for example attached to one of the ball reservoirs 200 allocated to the respective alley, in order to readout the game equipment memory of the balls. The mentioned reception/reading apparatus R1, R2, R3, Rn monitor the game equipment identification S1, S2, S3, Sn and impart these to a release apparatus 5 which is arranged in the computer 3. If the right participant is standing with the right ball in the right alley the corresponding alley and the corresponding ball is activated in the ball memory 200.

Hereto also the participant memory TS1, TS2, TSn of the respective participants is readout by means of the there foreseen reception/reading apparatus P1, P2, Pn. This can occur, for example, by the respective participant putting his RFID card into the corresponding reading apparatus P1, P2, P3, Pn or bringing it into contactless communication. The readout participant identification TID1, TID2, TIDn are subsequently sent to the mentioned release apparatus 5 in order to be compared there with the allocation specified by the computer 3 in accordance with the indicator 4 according to FIG. 2. If the right participant is on the right alley, the respective alley or the skittle setter apparatus D1, D2, D3, Dn allocated thereto is released. The respective skittle setter apparatus D1, D2, D3, Dn can be connected to the computer 3 via a wired and/or wireless data connection 34.

If all participants are on the specified alleys, and if all game equipment V1, V2, V3, Vn is on the right alleys the computer 3 can generate a corresponding starting signal, which is made to indicate in a suitable manner, for example also on the indicator 4.

Depending on which participant becomes active and plays an alley the corresponding camera 7 or 8 is activated in order to transmit the attempt. Advantageously the switch of the mentioned cameras 7, 8 can be controlled in dependence of the readout game equipment identification. If for example switch means 9, 10 are foreseen on the ball memory 200 of the skill/skilled sport installation 1, which register the removal of a respective game equipment V1, V2, Vn, the corresponding cameras 7, 8 can be put in operation or the provided image thereof can be released for transmission, wherein, for example, the camera angle of the computer 3 can be placed onto the alley, on which a ball was taken from the ball memory 200.

Advantageously prior to each game and/or after the execution of a specified number of games a renewed ascertainment of a combination participant<->game equipment<->alley can take place, wherein it is also possible to select out of all registered participants. Advantageously the computer 3 performs this automatically. With the mentioned renewed ascertainment of the participants, the game equipment and the alleys and their allocation to each other the security against manipulation or collusion is increased.

The request or user terminals 500, which permit a usage of the random number generator and the request of a random number and are in connection with the game installation, have advantageously an indicator apparatus 501, for example in form of one or multiple screens, an input apparatus 502, for example in form of a keyboard or a touch screen, in order to be able to enter command into the apparatus, as well as a determination apparatus 301 for the ascertainment of random numbers or random number combinations, wherein the mentioned determination apparatus 301 is foreseen immediately in the user terminal 500 but also advantageously in a therewith connected, separate server 300, which advantageously can select multiple user terminals 500 und connect with the skill/skilled sport installation 1. As shown in FIG. 1 the central computer 3, which controls the monitoring of the skittle alleys and the game operation on the skittle alleys, can communicate via a data distance connection, for example, in form of a satellite communication connection 400 with the central server 300.

The ascertainment of the random number occurs in the mentioned manner with a game on a skittle alley installation 1, wherein it can be foreseen, for example, that the random number is calculated out of multiple game outcomes, for example in such a manner that each one attempt on each of the four alleys is considered and subsequently the number of hits of each attempt performed per alley is added. In the shown example the winning number 16 was ascertained as on the first alley seven skittles, on the second alley two skittles, on the third alley four skittles and on the fourth alley three skittles, i.e. altogether sixteen skittles, were overturned.

In a further advantageous embodiment of the invention it can also be foreseen that for the ascertainment of different random numbers or the ascertainment of the assignment of the number slots of a random number combination different skill/skilled sport installations can be used. For example, on the screen 501 of a request or user terminal 500 different skittle alleys at different locations can be indicated, for example the first skittle alley in Vienna, the second skittle alley in Munich, and a third skittle alley in Milan, wherein the there occurring course of the game can be indicated, for example, by corresponding cameras. At the user terminal 500 a selection apparatus 510 can be advantageously foreseen in form of a touch screen in order to facilitate the user the selection of a desired skittle alley for the ascertainment of "his" random numbers. In the embodiment shown in FIG. 3 hereby different skittle alleys or skill/skilled sport installations X1, X2, Xn can be selected in order to ascertain one or multiple random numbers. Accordingly in the present case the skill/skilled sport installation X1 can be selected or activated by a selection control 511, the installation X2 via a selection control 512 and the installation Xn via a selection control 513. The game outcomes from the selected game locations can be used in the mentioned manner in accordance with a predetermined calculation determination for the determination of, for example, the addition of one random number or multiple random numbers. In addition the calculation determination can feature a subtraction, multiplication, division or a combination thereof.

The selection apparatus 510 can be alternatively foreseen for the configuration on a configuration server. Furthermore the selection apparatus 510 can be designed as a web interface which is operable and configurable via a web browser and can impart correspondingly configured and/or selected data of the different skittle alleys or skill/skilled sport installations X1, X2, Xn as a random number or random numbers.

We claim:

1. A random number generator for the provision of at least one of a random number, a random number combination and a random number matrix, comprising:
  a gaming or gambling machine comprising a user terminal and a screen;
  a first monitoring apparatus comprising cameras configured to monitor a first gameplay facility where a game-of-skill capable of providing one or more game outcomes is played by a participant,
    wherein the cameras are configured to record real-time video images of the game-of-skill, wherein the screen is configured to display the real-time video images so that an end user can follow gameplay and make query decisions,
wherein the user terminal is configured to receive a query from the end user requesting the at least one of a random number, a random number combination and a random number matrix;
a game outcome device configured to determine the one or more game outcomes, the one or more game outcomes comprising numerical values; and
a determination device configured to determine the at least one of a random number, a random number combination and a random number matrix from the one or more game outcomes,
wherein the random number combination comprises a sequence of number slots to which numbers can be assigned and the random number matrix comprises an array of number slots to which numbers can be assigned,
wherein the at least one of a random number, a random number combination and a random number matrix is determined and transmitted to the gaming or gambling machine upon a query by the end user during gameplay,
wherein the determination device comprises at least one of a computation and allocation apparatus,
wherein the computation apparatus, using one or more first predetermined rules, is configured to compute one or more random numbers from the one or more game outcomes, and
wherein the allocation apparatus, using one or more second predetermined rules, is configured to assign at least one of the one or more game outcomes and one or more random numbers to a number slot in at least one of the random number combination and the random number matrix.

2. The random number generator of claim 1, wherein the first gameplay facility comprises a skittle alley installation, bowling alley installation, dart stand installation or shooting gallery installation.

3. The random number generator of claim 1, wherein the first gameplay facility comprises a bowling alley installation or a skittle alley installation comprising alleys on which the game-of-skill can be played by different participants,
wherein the alleys on which the game-of-skill is played are capable of providing one or more game outcomes,
wherein the first monitoring apparatus is configured to monitor the alleys,
wherein the game outcome device is configured to determine the one or more game outcomes of the alleys on which the game-of-skill is played,
wherein the determination device is configured to determine the at least one of a random number, a random number combination and a random number matrix from the one or more game outcomes of the alleys, and
wherein the allocation apparatus is configured to assign the one or more game outcomes of the alleys to a number slot in at least one of the random number combination and the random number matrix.

4. The random number generator of claim 3, wherein the allocation apparatus is further configured to assign the one or more game outcomes of the alleys from different rounds of the game-of-skill to at least one of a row of number slots and a column of number slots in the random number matrix.

5. The random number generator of claim 3, further comprising an electronic random number generator configured to allocate the different participants to the alleys.

6. The random number generator of claim 3, further comprising game equipment having equipment memory in which equipment data is saved and an equipment reading apparatus configured to read the equipment data and save it in a first memory in a database.

7. The random number generator of claim 6, further comprising participant memory separate from the equipment memory in which participant data is saved and a participant reading apparatus,
wherein the participant and equipment reading apparatuses are configured to read the participant data and save it in the first memory or a second memory in the database,
wherein the equipment and participant data saved in the database are allocated to each other and saved in a data table, and
wherein a renewed readout of the game equipment data and participant data is executed to compare the renewed readout with the data table to confirm whether the allocations in the data table were adhered to.

8. The random number generator of claim 7, wherein at least one of the equipment and participant memory comprises an RFID element and wherein at least one of the equipment and reading apparatus comprises an RFID reading apparatus.

9. The random number generator of claim 7, wherein the allocation of the equipment and participant data occurs automatically via an electronic random number generator and wherein the allocation of the equipment and participant data is indicated on an indicator display prior to the commencement of the game-of-skill.

10. The random number generator of claim 7, wherein each alley is equipped with the equipment reading apparatus, and wherein each equipment reading apparatus is configured to only read game equipment that is associated with the alley on which the equipment reading apparatus is equipped.

11. The random number generator of claim 10, wherein at least one of the equipment and participant data is allocated to the alleys automatically via a random number generator and is indicated on an indicator display prior to the commencement of the game-of-skill.

12. The random number generator of claim 11, further comprising release apparatuses on each alley, wherein each release apparatus is configured to release when the equipment data read by the equipment reading apparatus corresponds with the allocated alley.

13. The random number generator of claim 11, wherein a start signal is created by a starting apparatus when the equipment data read from the game equipment memories and the participant data read from the participant memories each correspond to their allocated alley.

14. The random number generator of claim 7, wherein the cameras are configured to be activated when at least one of the equipment and participant data is read by the equipment or participant reading apparatus.

15. The random number generator of claim 14, further comprising switch times between the cameras, wherein the switch times are controlled in dependence of the game equipment data read from the game equipment memory.

16. The random number generator of claim 1, further comprising a selection apparatus and a second monitoring apparatus comprising cameras configured to monitor a second gameplay facility where the game-of-skill is played by another participant,
wherein the first and second gameplay facilities are at different locations, wherein the selection apparatus is configured to select at least one of the first and second gameplay facility, wherein the determination device is configured to determine the at least one of a random number, a random number combination and a random number matrix from the one or more game outcomes of at least one of the first and second gameplay facility selected via the selection apparatus, wherein the selection apparatus comprises at least one of a random number generator and an input device wherein the random number generator is configured to randomly select the at least one of the first and second gameplay facility, and wherein the input device is configured to give the end user the option to select the at least one of the first and second gameplay facility either manually or via the random number generator.

17. The random number generator of claim 16, wherein the selection apparatus further comprises an allocator configured to assign one or more game outcomes from a selected gameplay facility to a number slot in at least one of the random number combination and the random number matrix.

18. The random number generator of claim 1, wherein the gaming or gambling machine further comprises an input device, and wherein the screen is arranged at a position visible from the input device.

19. The random number generator of claim 1, wherein the user terminal has an input element configured to trigger the query and transmission of the at least one of a random number, a random number combination and a random number matrix.

20. The random number generator of claim 19, wherein the input element comprises a key or a touch screen.

21. The random number generator of claim 1, wherein the at least one of a random number, a random number combination and a random number matrix is transmitted by the determination device to the gaming or gambling machine via a data distance connection upon a query by the end user.

22. A random number generator for the provision of at least one of a random number, a random number combination and a random number matrix, comprising:
   a gaming or gambling machine comprising a user terminal and a screen;
   monitoring apparatuses comprising cameras configured to monitor gameplay facilities where a game-of-skill capable of providing one or more game outcomes is played by a participant,
      wherein at least two gameplay facilities are located in different cities,
      wherein the user terminal is at a location different from the gameplay facilities,
      wherein the cameras are configured to record real-time video images of the game-of-skill,
      wherein the screen is configured to display the real-time video images so that an end user can follow gameplay and make query decisions;
   a game outcome device configured to determine the one or more game outcomes, the one or more game outcomes comprising numerical values;
   a selection apparatus configured to select at least one of the monitoring apparatuses in response to a selection signal received at the gaming or gambling machine; and
   a determination device configured to determine the at least one of a random number, a random number combination and a random number matrix from the one or more game outcomes,
      wherein the determination device is at a location different from at least one of the gameplay facilities,
      wherein the at least one of a random number, a random number combination and a random number matrix is determined from the one or more game outcomes monitored by the at least one selected monitoring apparatus,
      wherein the at least one of a random number, a random number combination and a random number matrix is transmitted by the determination device to the gaming or gambling machine via a data distance connection upon a query by the end user,
      wherein the random number combination comprises a sequence of number slots to which numbers can be assigned and the random number matrix comprises an array of number slots to which numbers can be assigned,
      wherein the determination device comprises at least one of a computation and allocation apparatus,
      wherein the computation apparatus, using one or more first predetermined rules, is configured to compute one or more random numbers from the one or more game outcomes monitored by the at least one selected monitoring apparatus, and
      wherein the allocation apparatus, using one or more second predetermined rules, is configured to assign at least one of the one or more random numbers and the one or more game outcomes monitored by the at least one selected monitoring apparatus and to a number slot in at least one of the random number combination and the random number matrix.

23. The random number generator of claim 22, wherein the user terminal has an input element configured to trigger the query and transmission of the at least one of a random number, a random number combination and a random number matrix.

24. The random number generator of claim 23, wherein the input element comprises a key or a touch screen.

25. A random number generator for the provision of at least one of a random number, a random number combination and a random number matrix, comprising:
   a gaming or gambling machine comprising a screen;
   monitoring apparatuses comprising cameras configured to monitor at least one gameplay facility where a game-of-skill capable of providing one or more game outcomes is played by one or more participants,
      wherein the cameras are configured to transmit television images of at least one game-of-skill to the screen,
      wherein at least one gameplay facility comprises alleys,
      wherein at least one camera is configured to be activated when a participant or piece of game equipment is detected on an alley,
      wherein the television images of an activated camera are transmitted to the screen,
   a game outcome device configured to determine the one or more game outcomes, the one or more game outcomes comprising numerical values; and
   a determination device configured to determine the at least one of a random number, a random number combination and a random number matrix from the one or more game outcomes, wherein the at least one of a random number, a random number combination and a random number matrix is transmitted by the determination device to the gaming or gambling machine via a data distance connection upon a query by an end user.

26. The random number generator of claim 25, wherein the gaming or gambling machine has an input element configured to trigger the query and transmission of the at least one of a random number, a random number combination and a random number matrix.

27. The random number generator of claim 26, wherein the input element comprises a key or a touch screen.

\* \* \* \* \*